(12) United States Patent
Stevens et al.

(10) Patent No.: US 9,206,651 B2
(45) Date of Patent: Dec. 8, 2015

(54) COUPLING MEMBERS FOR COUPLING A BODY OF AN EARTH-BORING DRILL TOOL TO A DRILL STRING, EARTH-BORING DRILLING TOOLS INCLUDING A COUPLING MEMBER, AND RELATED METHODS

(75) Inventors: John H. Stevens, Spring, TX (US); Jimmy W. Eason, The Woodlands, TX (US); Ian D. Harris, Columbus, OH (US)

(73) Assignee: Baker Hughes Incorporated, Houston, TX (US)

( * ) Notice: Subject to any disclaimer, the term of this patent is extended or adjusted under 35 U.S.C. 154(b) by 1275 days.

(21) Appl. No.: 12/603,978

(22) Filed: Oct. 22, 2009

(65) Prior Publication Data

US 2010/0133805 A1      Jun. 3, 2010

Related U.S. Application Data

(60) Provisional application No. 61/109,793, filed on Oct. 30, 2008.

(51) Int. Cl.
*E21B 10/00* (2006.01)
*E21B 10/42* (2006.01)

(52) U.S. Cl.
CPC ................. *E21B 10/42* (2013.01); *E21B 10/00* (2013.01)

(58) Field of Classification Search
CPC ......... E21B 10/54; E21B 10/00; E21B 10/02; E21B 10/08; E21B 10/20; E21B 10/36; E21B 10/42; E21B 10/46; E21B 10/62

USPC .......................................... 175/320, 327, 425
See application file for complete search history.

(56) References Cited

U.S. PATENT DOCUMENTS

| | | | | |
|---|---|---|---|---|
| 4,372,404 A * | 2/1983 | Drake | ........................... | 175/374 |
| 5,373,907 A * | 12/1994 | Weaver | ........................ | 76/108.2 |
| 5,740,873 A | 4/1998 | Tibbitts | | |
| 7,398,840 B2 * | 7/2008 | Ladi et al. | ...................... | 175/425 |
| 7,784,381 B2 * | 8/2010 | Ladi et al. | ..................... | 76/108.2 |
| 2006/0231293 A1 * | 10/2006 | Ladi et al. | ....................... | 175/374 |
| 2007/0102198 A1 | 5/2007 | Oxford et al. | | |
| 2007/0102199 A1 | 5/2007 | Smith et al. | | |
| 2007/0102200 A1 * | 5/2007 | Choe et al. | .................... | 175/374 |
| 2008/0101977 A1 | 5/2008 | Eason et al. | | |

(Continued)

OTHER PUBLICATIONS

U.S. Appl. No. 12/133,288, filed Jun. 4, 2008, entitled "Methods of Attaching a Shank to a Body of an Earth-Boring Tool Including a Load Bearing Joint and Tools Formed by such Methods," by Redd H. Smith et al.

(Continued)

*Primary Examiner* — Elizabeth Gitlin
(74) *Attorney, Agent, or Firm* — TraskBritt (57) ABSTRACT

Coupling members for coupling an earth-boring drill tool to a drill string, drilling tools including a coupling member attached to a body of an earth-boring drill tool, methods for forming drilling tools including a coupling member, and methods for forming coupling members are disclosed. A coupling member may include a distal region comprising a first material composition and a proximal region comprising a second, different material composition. A drilling tool may include a body that is attached to a coupling member with a varied material composition for coupling the body to a drill string.

22 Claims, 6 Drawing Sheets

(56) References Cited

U.S. PATENT DOCUMENTS

| | | | |
|---|---|---|---|
| 2008/0135304 A1 | 6/2008 | Duggan et al. | |
| 2009/0032571 A1 | 2/2009 | Smith | |
| 2010/0187018 A1* | 7/2010 | Choe et al. | 175/426 |
| 2010/0192475 A1* | 8/2010 | Stevens et al. | 51/309 |
| 2010/0193255 A1* | 8/2010 | Stevens et al. | 175/435 |
| 2011/0142707 A1* | 6/2011 | Choe et al. | 419/17 |
| 2011/0186261 A1* | 8/2011 | Choe et al. | 164/76.1 |

OTHER PUBLICATIONS

Search Report for International Application No. PCT/US2009/061644 mailed Mar. 30, 2010, 4 pages.
Written Opinion for International Application No. PCT/US2009/061644 mailed Mar. 30, 2010, 4 pages.
International Preliminary Report on Patentability for International Application No. PCT.US2009/061644 dated May 3, 2011, 5 pages.

* cited by examiner

FIG. 7

COUPLING MEMBERS FOR COUPLING A BODY OF AN EARTH-BORING DRILL TOOL TO A DRILL STRING, EARTH-BORING DRILLING TOOLS INCLUDING A COUPLING MEMBER, AND RELATED METHODS

CROSS-REFERENCE TO RELATED APPLICATIONS

This application claims the benefit of U.S. Provisional Patent Application Ser. No. 61/109,793, filed Oct. 30, 2008, the disclosure of which is incorporated by reference herein in its entirety.

TECHNICAL FIELD

The present invention generally relates to earth-boring drill bits and other tools that may be used to drill subterranean formations, and to methods of manufacturing such drill bits and tools. More particularly, embodiments of the present invention relate to methods for attaching a shank to a body of tool such as an earth-boring drilling tool, and to drill bits and other tools that include a shank attached to a body.

BACKGROUND

Figure 1:
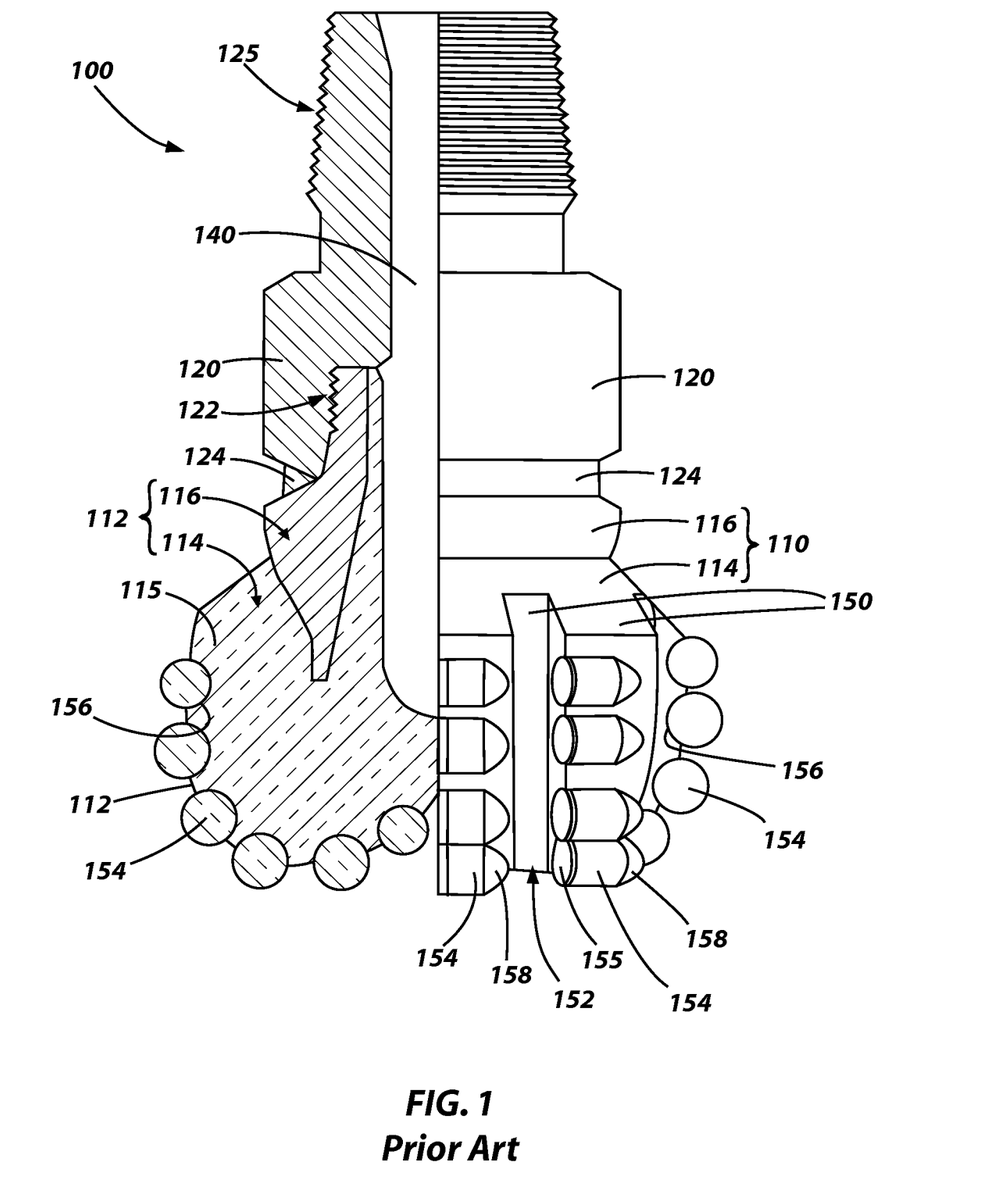
FIG. 1 is a partial cross-sectional view of a conventional earth-boring rotary drill bit.

Drill bits are commonly used for drilling bore holes or wells in earth formations. One type of earth-boring drill bit is the fixed-cutter bit (often referred to as a "drag" bit), which typically includes a plurality of cutting elements secured to a face region of a bit body. The bit body of an earth-boring drill bit may be formed from steel. Alternatively, the bit body may be formed from a particle-matrix composite material. A conventional earth-boring drill bit 100 is shown in FIG. 1 that includes a bit body 110 comprising a particle-matrix composite material 115. The bit body 110 is secured to a steel shank 120 having a threaded connection portion 125 for attaching the drill bit 100 to a drill string (not shown). An example of such a threaded connection portion is an American Petroleum Institute (API) threaded connection portion. The bit body 110 includes a crown 114 and a steel blank 116. The steel blank 116 is partially embedded in the crown 114. The crown 114 includes a particle-matrix composite material such as, for example, particles of tungsten carbide embedded in a copper alloy matrix material. The bit body 110 is secured to the shank 120 by way of a threaded connection 122 and a weld 124 extending around the drill bit 100 on an exterior surface thereof along an interface between the bit body 110 and the steel shank 120.

The bit body 110 further includes wings or blades 150 that are separated by junk slots 152. Internal fluid passageways (not shown) extend between a face 112 of the bit body 110 and a longitudinal bore 140, which extends through the steel shank 120 and partially through the bit body 110. Nozzle inserts (not shown) also may be provided at the face 112 of the bit body 110 within the internal fluid passageways.

A plurality of cutting elements 154 is attached to the face 112 of the bit body 110. Generally, the cutting elements 154 of a fixed-cutter type drill bit have either a disk shape or a substantially cylindrical shape. A cutting surface 155 comprising a hard, super-abrasive material, such as mutually bound particles of polycrystalline diamond, may be provided on a substantially circular end surface of each cutting element 154. Such cutting elements 154 are often referred to as "polycrystalline diamond compact" (PDC) cutting elements 154. The PDC cutting elements 154 may be provided along the blades 150 within pockets 156 formed in the face 112 of the bit body 110, and may be supported from behind by buttresses 158, which may be integrally formed with the crown 114 of the bit body 110. Typically, the cutting elements 154 are fabricated separately from the bit body 110 and secured within the pockets 156 formed in the outer surface of the bit body 110. A bonding material such as an adhesive or, more typically, a braze alloy may be used to secure the cutting elements 154 to the bit body 110.

During drilling operations, the drill bit 100 is secured to the end of a drill string (not shown), which includes tubular pipe and equipment segments coupled end to end between the drill bit 100 and other drilling equipment at the surface of the formation to be drilled. The drill bit 100 is positioned at the bottom of a well bore hole such that the cutting elements 154 are adjacent the earth formation to be drilled. Equipment such as a rotary table or top drive may be used for rotating the drill string and the drill bit 100 within the bore hole. Alternatively, the shank 120 of the drill bit 100 may be coupled directly to the drive shaft of a down-hole motor, which then may be used to rotate the drill bit 100. As the drill bit 100 is rotated, drilling fluid is pumped to the face 112 of the bit body 110 through the longitudinal bore 140 and the internal fluid passageways (not shown). Rotation of the drill bit 100 causes the cutting elements 154 to scrape across and shear away the surface of the underlying formation. The formation cuttings mix with and are suspended within the drilling fluid and pass through the junk slots 152 and the annular space between the well bore hole and the drill string to the surface of the earth formation.

Conventionally, bit bodies that include a particle-matrix composite material, such as the previously described bit body 110, have been fabricated in graphite molds using a so-called "infiltration" process. The cavities of the graphite molds are conventionally machined with a multi-axis machine tool. Fine features are then added to the cavity of the graphite mold by hand-held tools. Additional clay work also may be required to obtain the desired configuration of some features of the bit body. Where necessary, preform elements or displacements (which may comprise ceramic components, graphite components, or resin-coated sand compact components) may be positioned within the mold and used to define the internal passages, cutting element pockets 156, junk slots 152, and other external topographic features of the bit body 110. The cavity of the graphite mold is filled with hard particulate carbide material (e.g., tungsten carbide, titanium carbide, tantalum carbide, etc.). The preformed steel blank 116 may then be positioned in the mold at the appropriate location and orientation. The steel blank 116 typically is at least partially submerged in the particulate carbide material within the mold.

The mold then may be vibrated or the particles otherwise packed to decrease the amount of space between adjacent particles of the particulate carbide material. A matrix material (often referred to as a "binder" material), such as a copper-based alloy, may be melted, and caused or allowed to infiltrate the particulate carbide material within the mold cavity. The mold and bit body 110 are allowed to cool to solidify the matrix material. The steel blank 116 is bonded to the particle-matrix composite material forming the crown 114 upon cooling of the bit body 110 and solidification of the matrix material. Once the bit body 110 has cooled, the bit body 110 is removed from the mold and any displacements are removed from the bit body 110. Destruction of the graphite mold typically is required to remove the bit body 110.

The PDC cutting elements 154 may be bonded to the face 112 of the bit body 110 after the bit body 110 has been cast by, for example, brazing, mechanical, or adhesive affixation.

Alternatively, the cutting elements 154 may be bonded to the face 112 of the bit body 110 during the infiltration of the molten matrix material if thermally stable synthetic or natural diamonds are employed in the cutting elements 154.

After the bit body 110 has been formed, the bit body 110 may be secured to the steel shank 120. As the particle-matrix composite materials typically used to form the crown 114 are relatively hard and not easily machined, the steel blank 116 is used to secure the bit body 110 to the shank 120. Complementary threads may be machined on exposed surfaces of the steel blank 116 and the shank 120 to provide the threaded connection 122 there between. The steel shank 120 may be threaded onto the bit body 110, and the weld 124 then may be provided along the interface between the bit body 110 and the steel shank 120.

When utilizing new particle-matrix composite materials to form bodies of earth-boring tools (e.g., a rotary drill bit), which may require techniques such as powder compaction and sintering to form the bodies of the earth-boring tools, it may not be feasible or desirable to bond a machinable metal component, such as a shank or an extension (e.g., a "crossover"), to the particle-matrix composite material 115. Bonding a machinable metal component may not be feasible or desirable before the sintering process because the sintering process may be carried out at temperatures that exceed the melting temperature of the metal from which the machinable metal component is formed. Additionally, even if the sintering temperature is below the melting temperature of the metal component, the temperatures may still be hot enough to alter the microstructure of the metal such that it no longer exhibits required or desirable physical properties. As such, it may be necessary or desirable to bond a metal component, such as a shank or an extension, to the particle-matrix composite material 115 of the crown 114 of a bit body 110 after the crown 114 has been fully sintered to a desired final density. Such processes are described in, for example, U.S. patent application Ser. No. 11/272,439, which was filed Nov. 10, 2005 and entitled "Earth-Boring Rotary Drill Bits And Methods of Manufacturing Earth-Boring Rotary Drill Bits Having Particle-Matrix Composite Bit Bodies," the disclosure of which is incorporated herein in its entirety by this reference. Such methods may include, for example, welding or brazing a shank or an extension to the particle-matrix composite material 115 of the crown 114 of a bit body 110 after pressing and sintering a powder mixture to form the crown 114.

Shanks and extensions generally must be readily machinable to enable machining of threads or other features thereon that can be used to connect the shanks and extensions to the drill string. However, the metals from which the shanks and extensions are generally fabricated may not be compatible with the particle matrix composite material 115 of the crown 114 of the bit body 110. For example, it may be difficult or impossible to weld a metal component (e.g., a shank or an extension) to the particle-matrix composite material 115 of a bit body 110 due to differences in thermal expansion between the metal from which the metal component is fabricated and the particle matrix material 115. Such differences in thermal expansion may result in the formation of cracks in the metal component or the bit body when the metal component and the bit body 110 are welded together. As another example, the metals from which the shanks and extensions are generally fabricated may not be chemically compatible with the particle matrix composite material 115 of the crown 114 of the bit body 110. For example, as the metal component and the bit body 110 are heated during a welding or brazing process used to attach the metal component and the bit body 110 together, atomic diffusion may occur at the interface between the metal component and the bit body 110 resulting in the formation of phases of material that degrade the physical properties of the joint between the metal component and the bit body 110 (e.g., phases of material that are relatively brittle).

In view of the above, there is a need in the art for improved methods of attaching a body of an earth-boring tool comprising a particle-matrix composite material to metal components. More particularly, there is a need in the art for improved methods of attaching a particle-matrix composite bit body of an earth-boring rotary drill bit to a drill string.

BRIEF SUMMARY

In some embodiments, the present invention includes a coupling member for coupling an earth-boring drill tool to a drill string. The coupling member may include a distal region comprising a first material and a proximal region comprising a second, different material.

In additional embodiments, the present invention includes an earth-boring drilling tool comprising a body attached to a coupling member for coupling the body to a drill string. The coupling member may include a distal region comprising a first material and a proximal region comprising a second, different material.

In yet additional embodiments, the present invention includes a method for attaching a drilling tool body to a coupling member. The method may include forming a coupling member for coupling the body to a drill string, forming a distal region of the coupling member from a first material and forming a proximal region of the coupling member from a second material differing from the first material. The method may further comprise attaching the coupling member to the body.

In yet additional embodiments, the present invention includes a method of forming a coupling member for attaching a body and a steel shank of an earth-boring drilling tool. The method may include forming a first region of a coupling member using a feed material composition comprising a cemented carbide material compatible to attach the first region of the coupling member to a particle matrix body of an earth-boring drilling tool. The method may further comprise forming a second region of the coupling member by changing the feed material composition to comprise a metal or metal alloy material compatible to weld a steel shank to a portion of the second region of the coupling member.

BRIEF DESCRIPTION OF THE SEVERAL VIEWS OF THE DRAWINGS

While the specification concludes with claims particularly pointing out and distinctly claiming which are regarded as embodiments of the present invention, the advantages of embodiments of the invention may be more readily ascertained from the following description of embodiments of the invention when read in conjunction with the accompanying drawings in which:

DETAILED DESCRIPTION

The illustrations presented herein are not meant to be actual views of any particular material, drill bit, shank, or extension, but are merely idealized representations which that are employed to describe embodiments of the present invention. Additionally, elements common between figures may retain the same numerical designation.

As used herein, the terms "distal" and "proximal" are relative terms used to describe portions of a drilling tool, shank, or extension with reference to the surface of a formation to be drilled. A "distal" portion of a drilling tool, shank, or extension is the portion relatively more distant from the surface of the formation when the drilling tool, shank, or extension is disposed in a well bore extending into the formation during a drilling operation. A "proximal" portion of a drilling tool, shank, or extension is the portion in closer relative proximity to the surface of the formation when the drilling tool, shank, or extension is disposed in a well bore extending into the formation during a drilling operation.

As used herein the term "coupling member" means a portion of a drilling tool used to directly or indirectly couple the drilling tool to a drill string. In some embodiments, a coupling member may comprise an extension (e.g., crossover) used to attach a bit body of a drilling tool to a shank used to attach a drilling tool to a drill string. In other embodiments, a coupling member may comprise a shank used to attach a drilling tool to a drill string.

Figure 2A:
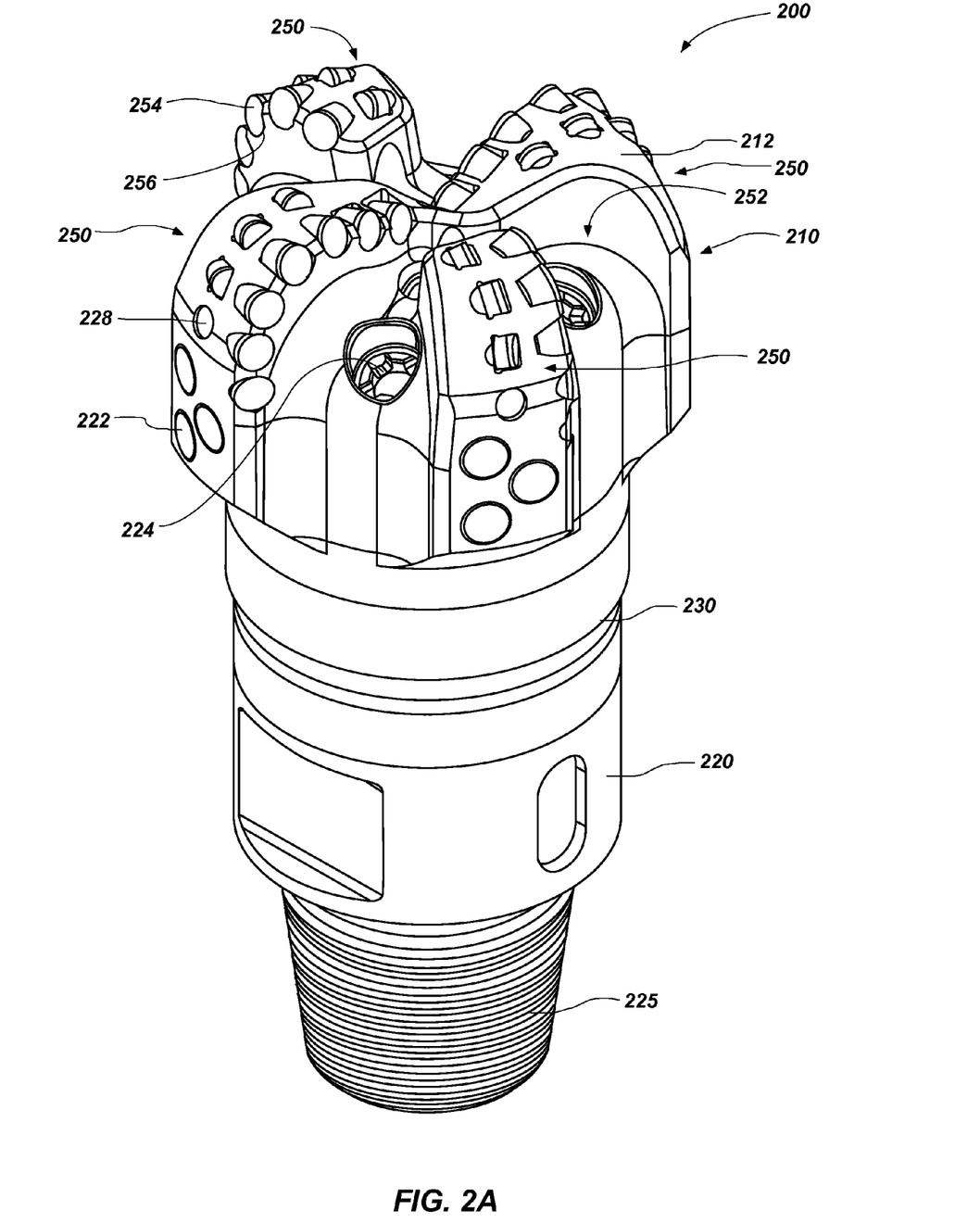
FIG. 2A is a perspective view of an embodiment of an earth-boring drilling tool of the present invention.
Figure 2B:
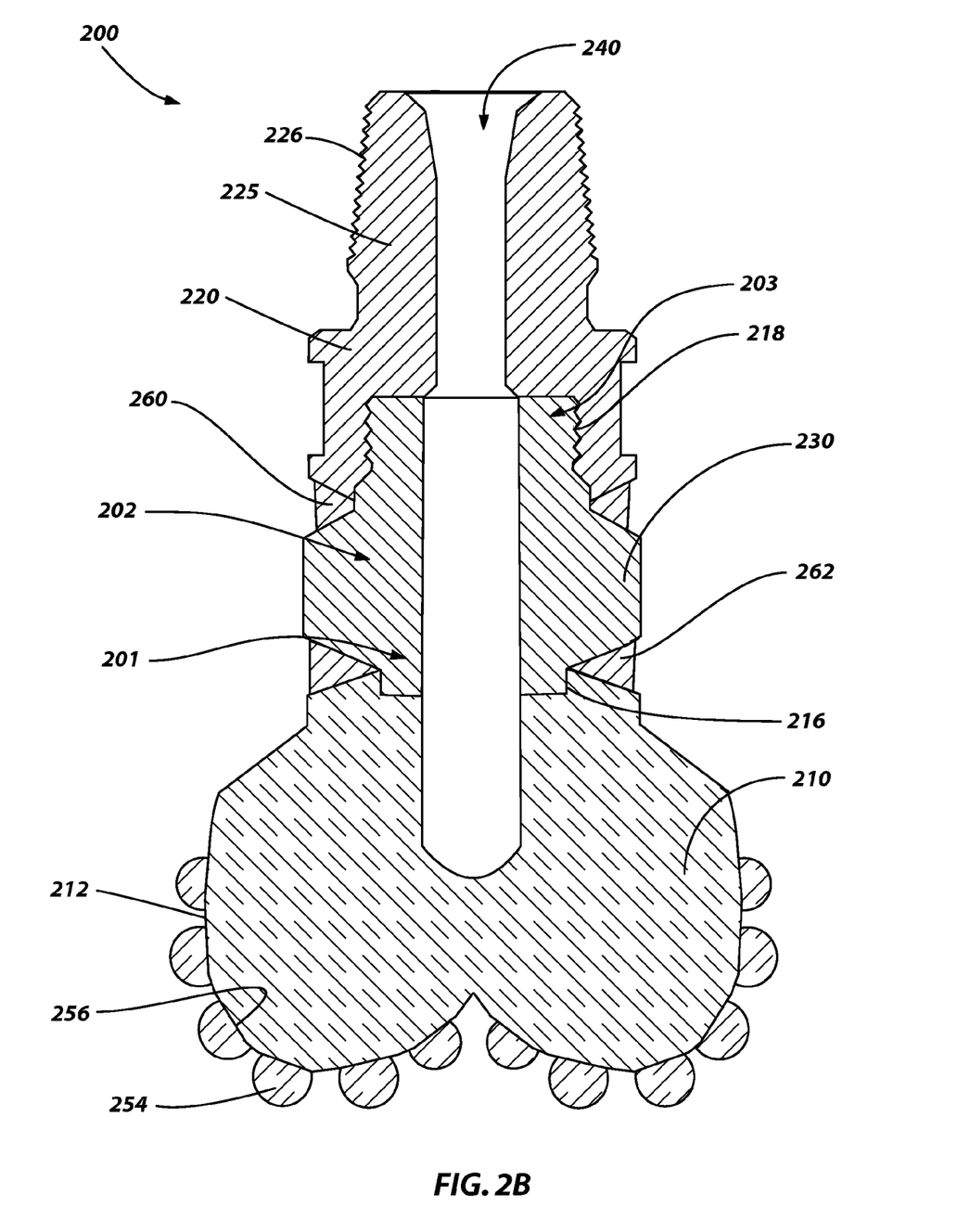
FIG. 2B is a longitudinal cross-sectional view of the earth-boring drilling tool shown in FIG. 2A.

FIGS. 2A and 2B illustrate an earth-boring drilling tool 200 (e.g., an earth-boring rotary drill bit) that includes a coupling member (e.g., an extension 230) that has a varied material composition thereacross and that is used to attach a bit body 210 with a shank 220. FIG. 2A shows a perspective view of an earth-boring drilling tool 200 according to an embodiment of the present invention. The earth-boring drilling tool 200 includes a bit body 210 attached to a shank 220 by the extension 230. In some embodiments, the bit body 210 may be predominantly comprised of a particle-matrix composite material. The bit body 210 may be secured to the shank 220, which has a threaded connection portion 225 (e.g., a male or female API threaded connection portion) for attaching the drilling tool 200 to a drill string (not shown). The bit body 210 may include blades 250, which are separated by junk slots 252. Internal fluid passageways (not shown) may extend between the face 212 of the bit body 210 and a longitudinal bore 240, which extends through the shank 220, the extension 230, and partially through the bit body 210. Nozzle inserts 224 may be provided at face 212 of the bit body 210 within the internal fluid passageways.

In some embodiments, the bit body 210 may include gage pads 222 and wear knots 228. As one particular non-limiting example, the bit body 210 may include four blades 250. The bit body 210 may include a plurality of cutting elements 254 (which may include, for example, PDC cutting elements) disposed on the face 212 of the bit body 210. The plurality of cutting elements 254 may be provided along the blades 250 within pockets 256 formed in the face 212 of the bit body 210.

The cutting elements 254 may comprise a wear-resistant abrasive material such as, for example, a particle-matrix composite material. In some embodiments, the particle-matrix composite material of the cutting elements may have a different composition from the particle-matrix composite material of the bit body 210. In some embodiments, the cutting elements 254 may be integrally formed with the bit body 210, such as in the case of impregnated cutting structures integrally formed with an impregnated bit body. Such impregnated structures may be formed with a metal or metal alloy phase that is impregnated with an abrasive material such as, for example, one or more of natural diamond material, synthetic diamond material, or cubic boron nitride material. The impregnated structures may include more than one type of abrasive material, as well as one or more sizes of abrasive material particles. Such impregnated structures may be fabricated by mixing the continuous phase material with the abrasive material and employing known processes, such as infiltration processes or pressing and sintering processes to fuse the mixture into a structure of desired shape.

With continued reference to FIGS. 2A and 2B, the bit body 210 may be fabricated using powder compaction and sintering techniques, such as, for example, those disclosed in pending U.S. patent application Ser. No. 11/271,153, filed Nov. 10, 2005 and entitled "Earth-Boring Rotary Drill Bits and Methods of Forming Earth-Boring Rotary Drill Bits," and pending U.S. patent application Ser. No. 11/272,439, filed Nov. 10, 2005 and entitled "Earth-Boring Rotary Drill Bits and Methods of Manufacturing Earth-Boring Rotary Drill Bits Having Particle-Matrix Composite Bit Bodies," the entire disclosure of each of which application is incorporated herein by this reference. As a brief overview of a manner in which a bit body 210 may be formed using such powder compaction and sintering techniques, a powder mixture may be pressed (e.g., with substantially isostatic pressure) within a mold or container. The powder mixture may include a plurality of hard particles and a plurality of particles comprising a matrix material. Optionally, the powder mixture may further include additives commonly used when pressing powder mixtures such as, for example, organic binders for providing structural strength to the pressed powder component, plasticizers for making the organic binder more pliable, and lubricants or compaction aids for reducing inter-particle friction and otherwise providing lubrication during pressing.

The container in which the powder mixture is disposed may include a fluid-tight deformable member such as, for example, a deformable polymeric bag. Inserts or displacement members may be provided within the container for defining features of the bit body 210 such as, for example, a longitudinal bore or plenum extending through the bit body 210. The container (with the powder mixture and any desired displacement members contained therein) may be pressurized within a pressure chamber using a fluid (which may be substantially incompressible) such as, for example, water, oil, or gas (e.g., air, nitrogen, etc.). The high pressure of the fluid causes the walls of the deformable member to deform, and the fluid pressure may be transmitted substantially uniformly to the powder mixture.

Pressing of the powder mixture may form a green (or unsintered) body which may be removed from the pressure chamber and container after pressing. Certain structural features may be machined in the green body using hand held tools and conventional machining techniques including, for example, turning techniques, milling techniques, and drilling techniques. For example, blades 250, junk slots 252, and other features may be machined or otherwise formed in the green body to form a partially shaped green body.

Figure 3:
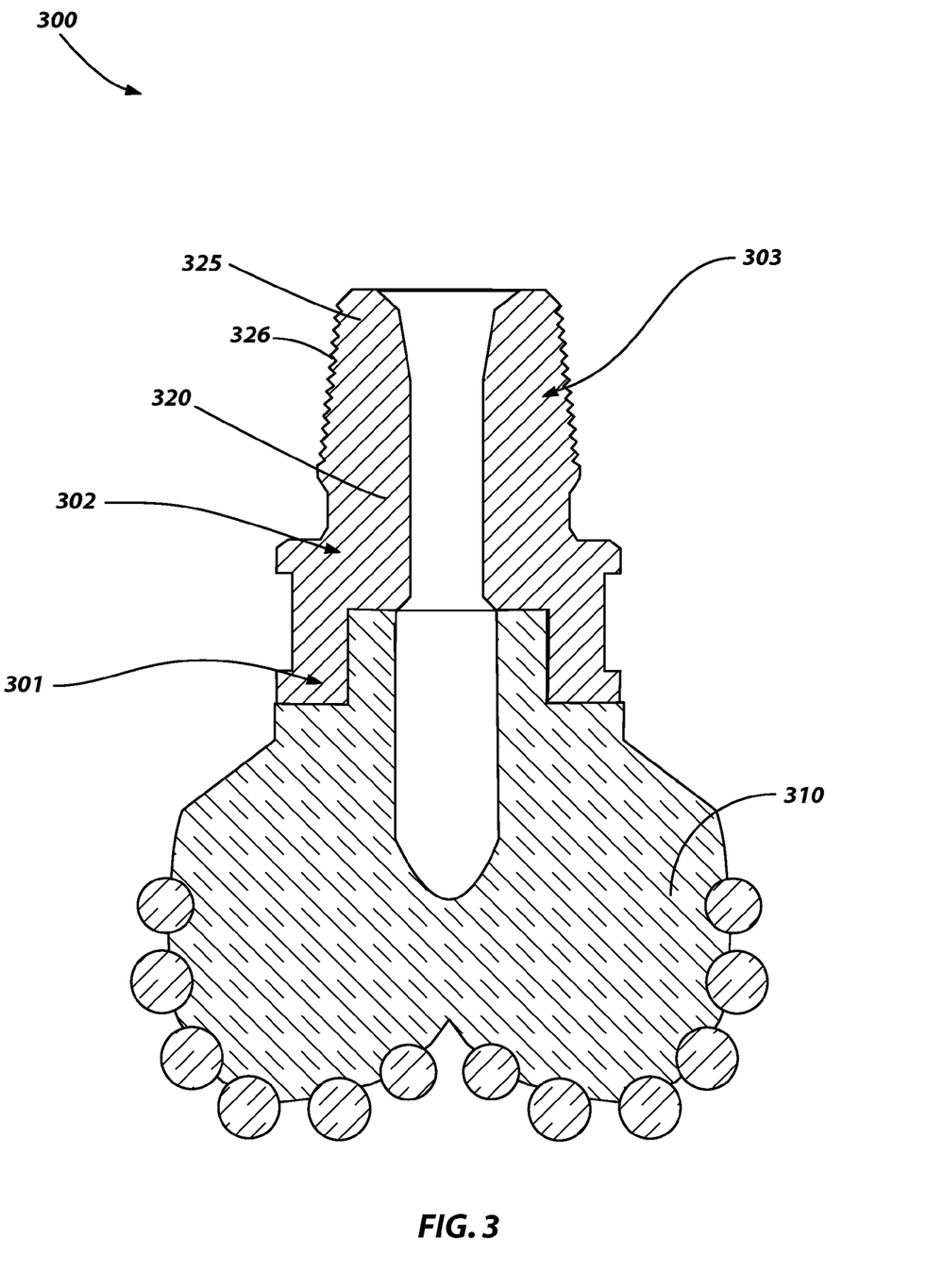
FIG. 3 is a cross-sectional view of another embodiment of an earth-boring drilling tool of the present invention.

FIG. 2B shows a longitudinal cross-sectional view of the earth-boring drilling tool 200 shown in FIG. 2A. In embodiments where the bit body 210 comprises a particle-matrix composite material that is not formed using conventional infiltration techniques, a preformed steel blank may not be integrally formed with the bit body 210 in the conventional method as shown in FIG. 1. In such embodiments, the shank 220 may be attached to the bit body 210 by the extension 230 which may be attached to the bit body 210. As shown in both FIGS. 2A and 2B, the bit body 210 may be secured to the shank 220 using the extension 230. In additional embodiments, the shank 220 may be secured directly to the bit body 210 without use of an intermediate extension 230, as shown in FIG. 3 and discussed in further detail below.

Referring now to FIG. 2B, the extension 230 may be formed to comprise a varied material composition that enables the extension 230 to be attached to both the shank 220 and the bit body 210 (e.g., a steel shank and a pressed and sintered particle-matrix bit body). For example, the shank 220 and a proximal region 203 of the extension 230 each may include a similar or identical metal material, such as, for example, steel or another iron-based alloy. The composition of the metal material of the proximal region 203 of the extension 230 may be selected to enable or facilitate machining of the threads 226 on the shank 220 to form the threaded connection portion 225. By forming the shank 220 and the proximal region 203 of the extension 230 from similar or identical metal materials, the ability to successfully weld the shank 220 and the extension 230 together may be enhanced (e.g., with a weld 260 that extends around at least a portion of the drill tool 200). For example, the proximal region 203 of the extension 230 may have a material composition that is chemically or metallurgically compatible with a material composition of the shank 220 such that the extension 230 can be successfully attached (e.g., welded, brazed, or a combination of welding and brazing) to the shank 220 without the formation of detrimental phases of material (e.g., brittle phases) near the boundary between the shank 220 and the extension 230 upon bonding the extension 230 to the shank 220. In some embodiments, the shank 220 and the extension 230 include a complementary threaded interface 218 between the shank 220 and the extension 230 to at least partially attach the shank 220 and the extension 230.

The bit body 210 and the distal region 201 of the extension 230 may comprise material that is different from the material of the shank 220 and the proximal region 203 of the extension 230. In some embodiments, the bit body 210 and the distal region 201 of the extension 230 may comprise a particle-matrix composite material such as, for example, a cemented tungsten carbide material (e.g., particles of tungsten carbide dispersed throughout and cemented within a metal matrix material).

Using a structure with a varied material composition may address the issues encountered when welding or mechanically attaching a threaded shank to the particle-matrix bit body. For example, the distal region 201 of the extension 230 may have a material composition that is chemically or metallurgically compatible with a material composition of the bit body 210 such that the extension 230 can be successfully attached (e.g., welded, brazed, or a combination of welding and brazing) to the bit body 210 without the formation of detrimental phases of material (e.g., brittle phases) near the boundary between the bit body 210 and the extension 230 upon bonding the extension 230 to the bit body 210. For example, when the distal region 201 of the extension 230 and the bit body 210 have a material composition that is chemically or metallurgically compatible, the extension 230 and the bit body 210 may be attached with a weld 262 that extends around at least a portion of the drilling tool 200. As a non-limiting example, a distal region 201 of the extension 230 may comprise a particle-matrix composite material such as, for example, particles of tungsten carbide cemented within cobalt or a cobalt-based metal alloy. By way of further example and not limitation, the particle-matrix composite material may comprise between about 15% and about 40% by weight cobalt or cobalt-based alloy matrix material and between about 60% and about 85% by weight tungsten carbide hard particles.

One or more other materials may be used to form intermediate regions of the extension 230 between the materials used at each of the opposite ends thereof (e.g., the proximal region 203 and the distal region 201) to maintain chemical or metallurgical compatibility across the length of the extension 230. The material composition of the extension 230 may change between the distal region 201 and the proximal region 203 thereof. For example, the concentration of hard particles (e.g., tungsten carbide particles) in the extension 230 may decrease from a maximum at the distal region 201 in a direction extending toward the proximal region 203 of the extension 230. In some embodiments, the concentration of hard particles in the extension 230 may be reduced to zero at an intermediate longitudinal location within the extension 230 (e.g., at a transitional region 202 between the proximal region 203 and the distal region 201). In a corresponding manner the concentration of the metal alloy matrix material (e.g., a cobalt-based metal alloy matrix material) may increase from a minimum at the distal region 201 in a direction extending toward the proximal region 203 of the extension 230. In some embodiments, the concentration of the matrix material in the extension 230 may be increased to 100% at an intermediate location within the extension 230 (e.g., at the transitional region 202 between the proximal region 203 and the distal region 201). Furthermore, the chemical composition of the matrix material in the extension 230 may be gradually changed in a substantially continuous manner, a stepped manner, or otherwise, across the length of the extension 230. For example, the chemical composition of the matrix material may be gradually changed from a cobalt or cobalt-based alloy at the distal region 201 to an iron or an iron-based alloy at the proximal region 203 of the extension 230. In some embodiments, the chemical composition of the matrix material in the extension 230 may be gradually changed from cobalt matrix material at the distal region 201, to a nickel or nickel-based alloy at an intermediate region (e.g., the transitional region 202), and finally to an iron or an iron-based alloy (e.g., a steel alloy) at the proximal region 203 of the extension 230.

As previously mentioned, the material composition of the proximal region 203 of the extension 230 may be selected to comprise a desirable alloy (e.g., a steel alloy) for welding together the extension 230 and the shank 220. After transitioning the material composition within the extension 230 to a desirable material composition of the proximal region 203 of the extension 230, it may be desirable to extend the proximal region 203 of the extension 230 such that there is a sufficient length of the proximal region 203 of the extension 230 having the desirable material composition to allow for future repairs and replacement of the steel shank 220. In such embodiments, to effect a repair, the extension 230 may be cut within the proximal region 203 of the extension 230, and the remaining portion of the proximal region 203 of the extension 230 be re-machined and re-welded to another shank 220 for re-use of the drilling tool 200.

In some embodiments, the extension 230 may be fabricated using a welding process such as, for example, a plasma transfer arc welding (PTAW) process, a shielded metal arc welding (SMAW) process, a gas metal arc welding (GMAW) process, a submerged arc welding process, an electron beam welding process, a laser beam welding process, a plasma spray process, or a high velocity oxygen fuel (HVOF) process. Such processes may include melting a feed material (e.g., powdered feedstock, wire feedstock, etc.) using a heat source (e.g., a plasma, an arc, a flame, etc.), and spraying or otherwise depositing the molten feedstock material onto a substrate (e.g., the bit body 110, the partially formed extension 230, or another underlying body of material), and allowing the molten feedstock material to cool, solidify, and fuse together and to the underlying substrate.

In some embodiments, the composition of a feedstock material may be changed as the extension 230 is built up and fabricated from one end or region thereof to the opposite end or region thereof in a layer-by-layer manner in such a way as to change the material composition of the extension 230 being fabricated. For example, the feed material may be formulated to comprise a cemented carbide (i.e., carbide particles and a matrix material). The cemented carbide may be deposited onto a substrate to from a portion of the extension 230 (e.g., the distal region 201). The composition of the feed material may be changed to cause the feed material to at least substantially comprise a metal or metal alloy material by reducing a concentration of the carbide particles in the feed material and introducing the metal or metal alloy into the feed material. In some embodiments, the metal or metal alloy may have a composition differing from the matrix material of the cemented carbide. The feed material may continue to be deposition to form the proximal region 203 of the extension 230 over the distal region 201 of the extension 230 while the feed material is at least substantially comprised of the metal or metal alloy material.

In some embodiments, the extension 230 may be formed directly on the bit body 210 after or during formation of the bit body 210. When the extension 230 is formed directly on the bit body 210, a weld groove may not be required and stress development due to welding in the axial (i.e., longitudinal) direction may be reduced. In some embodiments, the bit body 210 may be subjected to a thermal (heating) cycle before, during, and after the formation of the extension 230 on the bit body. Such thermal cycles may help to avoid cracking of the bit body 210 as the extension 230 is formed thereon and, in some embodiments, as the bit body 210 and the extension 230 are cooled after forming the extension 230.

In other embodiments, the extension 230 may be manufactured separately from the bit body 210 and then subsequently bonded to the bit body 210. For example, a separately manufactured extension 230 may be bonded to a bit body 210 using a welding process in which an interface 216 between the extension 230 and the bit body 210 is welded (e.g., the weld 262) at the exterior surfaces thereof as disclosed in, for example, U.S. patent application Ser. No. 11/833,510, which was filed Aug. 3, 2007 and entitled "Methods and Systems for Welding Particle-Matrix Composite Bodies," the disclosure of which is incorporated herein in its entirety by this reference.

Referring still to FIG. 2B, as another example, a separately manufactured extension 230 may be bonded to a bit body 210 in a sinter-bonding operation. In other words, the extension 230 may be positioned on the bit body 210, and the extension 230 and the bit body 210 may be heated to a temperature sufficient to cause atomic diffusion and bonding at the interface 216 therebetween. In such methods, the bit body 210 may comprise a green, brown, or fully sintered bit body 210. Bonding a preformed extension 230 to the bit body 210 may include establishing clean and parallel adjacent and abutting surfaces of the extension 230 and bit body 210 to enable attachment therebetween during the sinter-bonding process. To obtain clean and parallel interfaces 216 between the extension 230 and the bit body 210, a thin layer of compatible metal powder may be disposed between the bit body 210 and the extension 230. The thin layer of material may be, for example cobalt metal or a cobalt-based metal alloy. A weight may be placed atop the extension 230 to apply pressure between the extension 230 and the bit body 210 to ensure adequate bonding between the extension 230 and the bit body 210 during the sinter-bonding process. This weight may be separated from the extension 230 using a graphite-based material to prevent bonding of the weight and the extension 230 on each side of the graphite-based material. Such a material may include a film that may be bent, cut, shaped, and sized and situated in a way to separate the extension 230 and the weight. An example of such graphite-based material includes a GRAFOIL® film which is available from GrafTech International Holdings Inc. of Lakewood, Ohio. Another graphite-based material may be used that suspends graphite in a fluid or solvent which may be applied to the extension 230, the weight, or a combination thereof in order to prevent bonding during the sinter-bonding process. The liquid or solvent material may dry to create the film to separate and prevent bonding of the two objects. An example of such graphite-based material includes a DYLON® release agent which is available from Dylon Industries Inc. in Cleveland, Ohio. Alternatively, a ceramic oxide material may be used to prevent bonding of those parts.

In some embodiments, the bit body 210 and the extension 230 may be attached by brazing, welding, or a combination of welding and brazing the interface 216 between the surface of the bit body 210 and the surface of the extension 230, and the interface 216 may be configured such that the rotational forces, as well as longitudinal tensile forces, are primarily carried by the weld, braze, or a combination thereof. In additional embodiments, the bit body 210 and the extension 230 may be configured such that the extension 230 and the bit body 210 fit together or interlock with one another in such a manner as to mechanically carry at least a portion of the rotational forces and the longitudinal tensile forces, as described in pending U.S. patent application Ser. No. 11/637,327, which was filed Dec. 12, 2006 and entitled "Methods of Attaching a Shank to a Body of an Earth-Boring Drilling Tool, and Tools Formed by Such Methods," and in pending U.S. patent application Ser. No. 12/133,288, which was filed Jun. 4, 2008 and entitled "Methods of Attaching a Shank to a Body of an Earth-Boring Tool Including a Load Bearing Joint and Tools Formed by Such Methods," the entire disclosure of each of which application is incorporated herein by this reference.

The bit body 210 and the extension 230 may be sized and configured to provide a predetermined standoff at the interface 216 between the extension 230 and the bit body, in which a brazing alloy may be provided. The predetermined standoff at the interface 216 may, in some embodiments, vary in magnitude at selected locations between the bit body 210 and the extension 230. The standoff between the bit body 210 and the extension 230 may be provided by selectively placing bumps or knobs, each of which may be integrally formed with the bit body 210 or the extension 230, at selected locations on the interface 216 between the extension 230 and the it body 210. Furthermore, the brazing alloy may be applied to the interface 216 between the surface of the bit body 210 and the surface of the extension 230 using a furnace brazing process or a torch brazing process. The brazing alloy may include, for example, a silver-based or a nickel-based alloy.

In another embodiment of the present invention, the bit body 210 and the extension 230 may be attached through friction welding. Mating surfaces (e.g., the interface 216) may be provided on the extension 230 and the bit body 210. A machine may be used to press the extension 230 against the bit body 210 while rotating the bit body 210 relative to the extension 230. Heat generated by friction between the extension 230 and the bit body 210 may at least partially melt the material at the mating surfaces of the extension 230 and the bit body 210. The relative rotation may be stopped and the bit body 210 and the extension 230 may be allowed to cool while maintaining axial compression between the bit body 210 and the extension 230, providing a friction welded interface 216 between the mating surfaces of the extension 230 and the bit body 210.

In yet another embodiment of the present invention, a shrink fit may be provided between the extension 230 and the bit body 210 along the interface 216. By way of example and not limitation, the extension 230 may be heated to cause thermal expansion of the extension 230 while the bit body 210 is cooled to cause thermal contraction of the bit body 210. The extension 230 may then be placed onto the bit body 210 and the temperatures of the extension 230 and the bit body 210 may be allowed to equilibrate. As the temperatures of the extension 230 and the bit body equilibrate, the radially inner surface of the extension 230 may engage or abut against the surface of the bit body 210, at least partially securing the bit body 210 to the extension 230 and preventing separation of the bit body 210 from the extension 230.

FIG. 3 shows an earth-boring drilling tool 300 according to another embodiment of the present invention. The earth-boring drilling tool 300 may include a bit body 310 attached to a coupling member (e.g., a shank 320). The bit body 310 and shank 320 may be substantially similar to the bit body 210 and shank 220 shown and described with reference to FIGS. 2A and 2B. In contrast with FIG. 2B in which an extension 230 served as a crossover piece to attach the shank 220 to the bit body 210, the shank 320 in FIG. 3 is attached directly to the bit body 310. In such an embodiment, the material composition of the shank 320 may vary longitudinally through the shank 320 in a substantially similar matter to that previously described in relation to the extension 230 shown and described with reference to FIGS. 2A and 2B. The shank 320 may also be formed in manner similar to the extension 230 described above with reference to FIGS. 2A and 2B. The shank 320 may also include similar materials as the extension 230 described above with reference to FIGS. 2A and 2B. The shank 320 may be formed directly on the bit body 310, or may be formed separately and attached to the bit body 310 in a separate step as previously described. The base of the shank 320 (e.g., a distal region 301 of the shank 320) may be metallurgically compatible with the bit body 310 and may reduce the formation of detrimental phases when attaching or forming the shank 320 with the bit body 310. The shank 320 may also include a proximal region 303 selected to enable or facilitate machining of the threads 326 on the threaded connection portion 325 of the shank 320. The shank 320 may also include a transitional region 302 between the proximal region 303 and the distal region 301.

Figure 4:
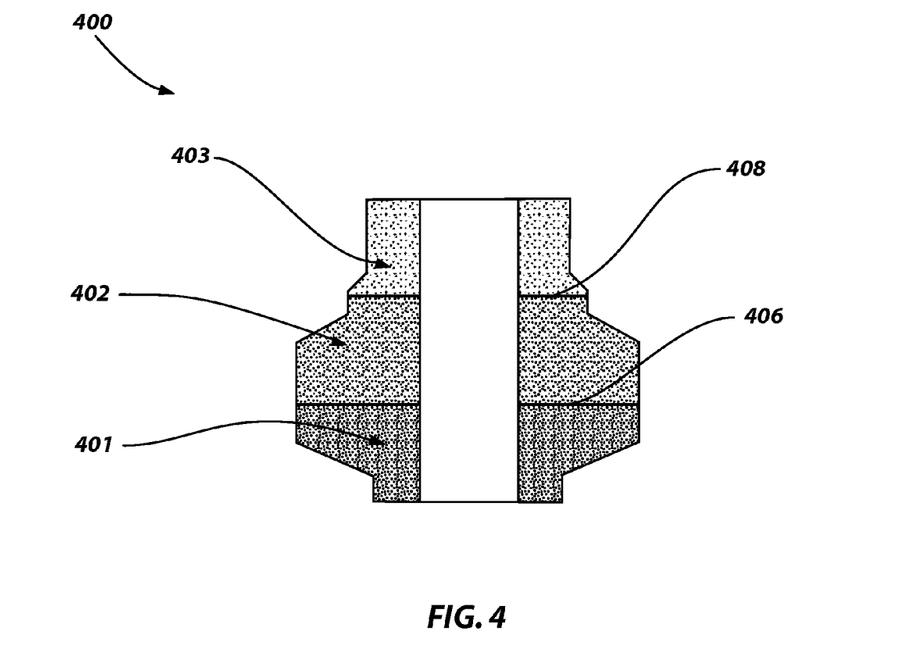
FIG. 4 is a cross-sectional view of an extension with a varied material composition in accordance with another embodiment of the present invention.
Figure 5:
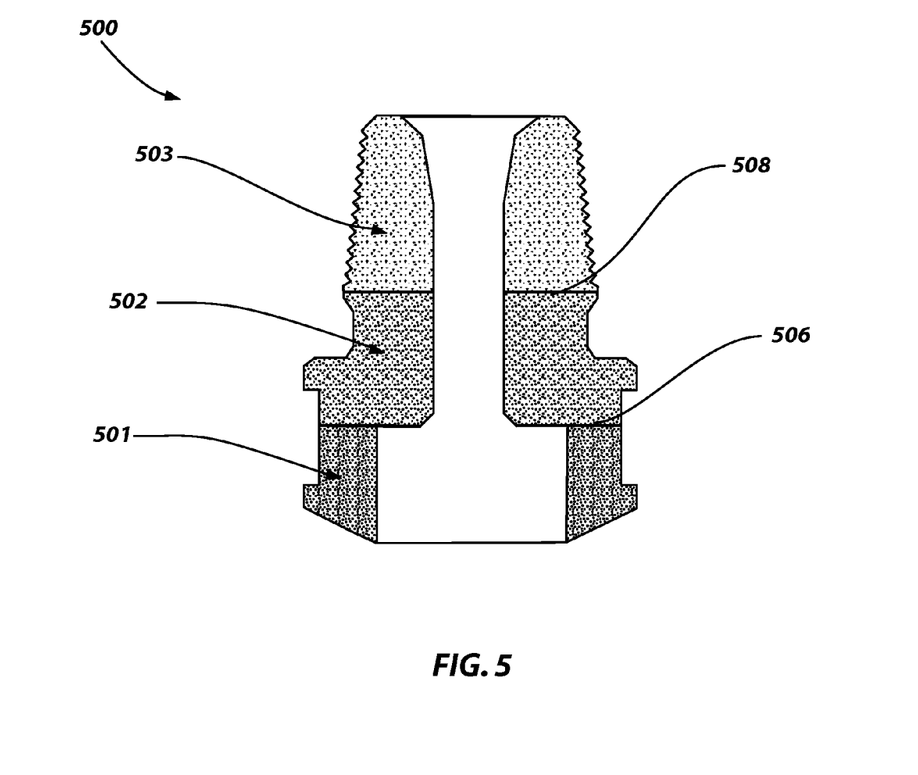
FIG. 5 is a cross-sectional view of a shank with a varied material composition in accordance with yet another embodiment of the present invention.

FIGS. 4 and 5 show cross sections representing structures (e.g., coupling members) with a varied material composition according to embodiments of the present invention. It is noted that the cross-hatching of each of the structures is presented to illustrate the variation of material in the structures and is not meant to represent any specific material. The structure may comprise an extension 400 similar to the extension 230 of FIGS. 2A and 2B (as shown in FIG. 4). The structure may also comprise a shank 500 similar to the shank 320 of FIG. 3 (as shown in FIG. 5).

As shown in FIG. 4, the extension 400 may have discrete regions such as a distal region 401, a transition region 402, and a proximal region 403. In some embodiments, the extension 400 may have more than three discrete regions that transition between the proximal region 403 and the distal region 401. The regions 401, 402, 403 may each comprise materials such as, for example, the materials discussed above with reference to the extension 230 shown and described in FIG. 2B. For example, the proximal region 403 may comprise a material such as steel or a steel alloy and the distal region 401 may comprise a material that is metallurgically compatible with a bit body such as a tungsten carbide particles cemented in a cobalt or cobalt-based metal matrix material, as previously described herein. The extension 400 may include three separate regions, each of which has a unique material composition that is at least substantially homogenous throughout the respective region. Furthermore, identifiable boundaries may be defined between each of the respective regions. As shown in FIG. 4, the extension 400 may include distinct, stepped regions (e.g., the distal region 401, the transition region 402, and the proximal region 403) of varying material composition where a first boundary 406 and a second boundary 408 are distinctly identifiable between the regions 401, 402, 403.

As shown in FIG. 5, the shank 500 may have discrete regions such as a distal region 501, a transition region 502, and a proximal region 503. In some embodiments, the shank 500 may have more than three discrete regions that transition between the proximal region 503 and the distal region 501. The regions 501, 502, 503 may each comprise materials such as, for example, the materials discussed above with reference to the extension 230 shown and described in FIG. 2B and the extension 400 shown and described in FIG. 4. The shank 500 may include three separate regions, each of which has a unique material composition that is at least substantially homogenous throughout the respective region. Furthermore, identifiable boundaries may be defined between each of the respective regions. As shown in FIG. 5, the shank 500 may include distinct, stepped regions (e.g., the distal region 501, the transition region 502, and the proximal region 503) of varying material composition where a first boundary 506 and a second boundary 508 are distinctly identifiable between the regions 501, 502, 503.

Figure 6:
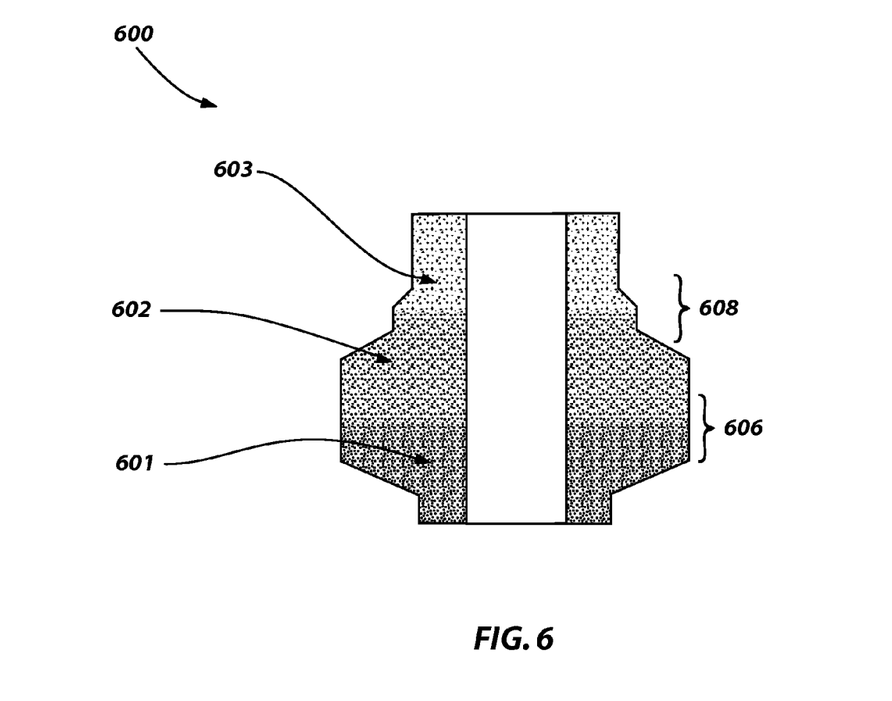
FIG. 6 is a cross-sectional view of an extension with a varied material composition in accordance with yet another embodiment of the present invention.
Figure 7:
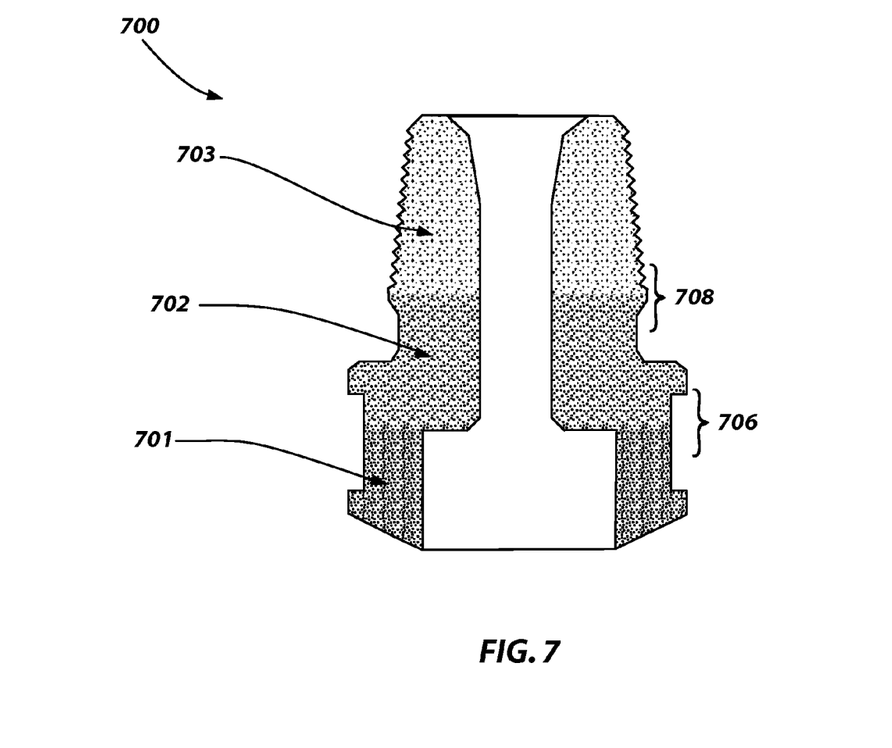
FIG. 7 is a cross-sectional view of a shank with a varied material composition in accordance with yet another embodiment of the present invention.

FIGS. 6 and 7 show cross sections representing structures with a varied material composition according to another embodiment of the present invention. Again, the cross-hatching of each of the structures is presented to illustrate the variation of material in the structures and is not meant to represent any specific material. The structure may comprise an extension 600 similar to the extension 230 of FIG. 2A and FIG. 2B (as shown in FIG. 6). The structure may also comprise a shank 700 similar to the shank 220 of FIG. 3 (as shown in FIG. 7).

As shown in FIG. 6, the extension 600 may comprise material regions 601, 602, and 603 which may, in some embodiments, contain materials similar to the materials discussed above with reference to the extension 230 shown and described with reference to FIG. 2B and the extension 400 and the shank 500 shown and described with reference to FIGS. 4 and 5. In contrast with the extension 400 and the shank 500 of FIGS. 4 and 5 that have distinct, stepped regions of varying material composition where boundaries are distinctly identifiable between the regions, the extension 600 may have a more gradual transition from one material to the other where boundary regions 606, 608 have a mixed composition of the different material regions 601, 602, 603 (e.g., a graded structure). In some embodiments, the extension 600 may not have any identifiable discrete boundaries or regions, and the material composition may gradually change across the extension 600 in the longitudinal direction. Such changes may be substantially continuous throughout the length of the extension 600, or the gradual material composition change may be effected only in transition areas between regions of differing material composition.

As shown in FIG. 7, the shank 700 may comprise material regions 701, 702, and 703 which may, in some embodiments, contain materials similar to the materials discussed above with reference to the extension 230 shown and described with reference to FIG. 2B and the extension 400, the shank 500, and the extension 600 shown and described with reference to FIGS. 4, 5, and 6. In contrast with the extension 400 and the shank 500 of FIGS. 4 and 5 that have distinct, stepped regions of varying material composition where boundaries are distinctly identifiable between the regions, the shank 700 may have a more gradual transition from one material to the other where boundary regions 706, 708 have a mixed composition of the different material regions 701, 702, 703 (e.g., a graded structure). In some embodiments, the shank 700 may not have any identifiable discrete boundaries or regions, and the material composition may gradually change across the shank 700 in the longitudinal direction. Such changes may be substantially continuous throughout the length of the shank 700, or the gradual material composition change may be effected only in transition areas between regions of differing material composition.

While FIGS. 4 through 7 show three regions of materials, embodiments within the scope of the present invention may include more or fewer regions of varying material composition to form a structure with a varied material composition with a first material at a top portion, and a second material at a base portion of the structure.

The present invention has been described herein in relation to embodiments of earth-boring drilling tools that include fixed cutters, also known as "drag" bits. However, other types of earth-boring drilling tools for forming or enlarging well bores such as, for example, core bits, eccentric bits, bicenter bits, reamers, mills, roller cone bits, "hybrid" bits having a combination of rolling and fixed cutting structures, and other such structures known in the art may be fabricated according to embodiments the present invention and may be formed using embodiments of methods of the present invention.

While the different embodiments of the present invention may be particularly applicable to attaching a bit body substantially formed from a particle-matrix composite material, a coupling member may be used to attach a shank to a bit body comprising materials other than particle-matrix composite materials.

Furthermore, while the present invention has been described herein with respect to certain embodiments, those of ordinary skill in the art will recognize and appreciate that it is not so limited. Rather, many additions, deletions, and modifications to the described embodiments may be made without departing from the scope of the invention as hereinafter claimed. The present invention is limited only by the scope of the claims which follow and their legal equivalents. In addition, features from one embodiment may be combined with features of another embodiment while still being encompassed within the scope of the invention as contemplated by the inventors.

What is claimed is:

1. An earth-boring drilling tool, comprising:
    a shank;
    a bit body; and
    an extension for coupling the shank of the earth-boring tool to the bit body of the earth-boring tool, the extension comprising:
        a distal region proximate a first end of the extension and proximate the bit body of the earth-boring tool, the distal region comprising a first material composition; and
        a proximal region proximate a second end of the extension opposite the first end and proximate the shank of the earth-boring tool, the proximal region comprising a second, different material composition, wherein the second material composition of the proximal region of the extension comprises one of a metal and a metal alloy comprising at least one of an iron, an iron-based alloy, a nickel, a nickel-based alloy, a cobalt, and a cobalt-based alloy, wherein the second end of the extension substantially entirely comprises the one of the metal and the metal alloy, and wherein the first material composition of the distal region of the extension comprises a cemented carbide material, and wherein the extension comprises an interspersed mixture of the first material composition and the second material composition that gradually transitions from the second material composition at the proximal region to the first material composition at the distal region.

2. The earth-boring drilling tool of claim 1, wherein the extension is separate from the bit body and the shank.

3. The earth-boring drilling tool of claim 2, further comprising a transitional region positioned between the distal region and the proximal region and comprising a third material composition, the third material composition differing from both the first material composition and the second material composition, wherein an entirety of the distal region is separated from the proximal region by the transitional region.

4. A method of attaching the bit body of the earth-boring drilling tool to the extension, the method comprising:
    forming the extension of claim 1 for coupling the bit body to a drill string; and
    attaching the distal region of the extension to the bit body of the earth-boring drilling tool.

5. The method of claim 4, wherein forming the extension for coupling the bit body to a drill string comprises forming the extension directly on the bit body.

6. The method of claim 5, wherein forming the extension for coupling the bit body to a drill string comprises:
    forming the distal region of the extension, comprising:
        formulating a feed material to comprise carbide particles and a matrix material; and
        depositing the feed material onto a substrate;
    changing a composition of the feed material to cause the feed material to predominantly comprise the metal or metal alloy material, comprising:
        reducing a concentration of the carbide particles in the feed material;
        introducing the metal or metal alloy material into the feed material; and
        selecting the metal or metal alloy material to have a composition differing from the matrix material; and
    continuing to deposit the feed material to form the proximal region of the extension over the distal region of the extension while the feed material is predominantly comprised of the metal or metal alloy.

7. The method of claim 4, wherein attaching the extension to the bit body comprises at least one of brazing the extension to the bit body, friction welding the extension to the bit body, soldering the extension to the bit body, shrink fitting the extension to the bit body, and sinter-bonding the extension to the bit body.

8. The method of claim 4, further comprising attaching the shank to the extension.

9. The method of claim 8, wherein attaching the shank to the extension comprises forming a threaded interface between the shank and the extension.

10. The method of claim 4, further comprising forming a threaded interface into the proximal region of the extension to attach the bit body to the drill string.

11. A method of forming the extension of claim 1 for attaching the bit body to the shank of the earth-boring drilling tool, the method comprising:
    forming the distal region of the extension using a feed material composition comprising the cemented carbide material compatible to attach the distal region of the extension to a particle matrix of the bit body of the earth-boring drilling tool; and
    forming the proximal region of the extension by changing the feed material composition to comprise the metal or metal alloy material compatibly to weld the shank comprising steel to a portion of the proximal region of the extension.

12. The method of claim 11, wherein forming the distal region of the extension comprises forming the extension using at least one of a plasma transfer arc welding process, a shielded metal arc welding process, a gas metal arc welding process, a submerged arc welding process, an electron beam welding process, a laser beam welding process, a plasma spray process, and a high velocity oxygen fuel process.

13. The method of claim 11, wherein forming the proximal region of the extension by changing the feed material composition to comprises the metal or metal alloy material comprises:
    reducing a concentration of carbide particles in the cemented carbide material of the feed material composition;
    introducing the metal or metal alloy material into the feed material composition; and
    selecting the metal or metal alloy material to have a composition differing from a matrix material of the cemented carbide material.

14. An earth-boring drilling tool, comprising:
    a body comprising a pressed and sintered particle-matrix material; and
    a coupling member attached to the body for coupling the body to a drill string, the coupling member comprising:
        a distal region proximate a first end of the coupling member and comprising a first material composition;
        a proximal region proximate a second end of the coupling member opposite the first end and comprising a second, different material composition, wherein the second end of the coupling member substantially entirely comprises at least one of a metal and a metal alloy; and
        a transitional region extending between the proximal region and the distal region, wherein the transitional region comprises a varied material composition comprising:
            at least one material of the first material composition of the distal region at a location adjacent the distal region; and
            at least one material of the second material composition of the proximal region at a location adjacent the proximal region.

15. The earth-boring drilling tool of claim 14, wherein the coupling member comprises an extension and the drilling tool further comprises a shank coupled to a proximal region of the extension.

16. The earth-boring drilling tool of claim 14, wherein the coupling member comprises a shank.

17. The earth-boring drilling tool of claim 14, wherein the at least one of the metal and the metal alloy of the proximal region of the coupling member comprises at least one of an iron, an iron-based alloy, a nickel, a nickel-based alloy, a cobalt, and a cobalt-based alloy.

18. The earth-boring drilling tool of claim 17, wherein the distal region of the coupling member comprises a cemented carbide material.

19. The earth-boring drilling tool of claim 14, wherein the varied material composition comprises a portion having a lower concentration of a cobalt matrix material in a cemented tungsten carbide material as compared to the distal region and having a higher concentration of a material comprising at least one of an iron matrix material, an iron-based alloy matrix material, a nickel matrix material, a nickel-based alloy matrix material, a cobalt matrix material, and a cobalt-based alloy matrix material as compared to the distal region.

20. The earth-boring drilling tool of claim 14, wherein the material composition of the coupling member comprises an interspersed mixture of the first material composition and the second material composition that varies gradually across the proximal region, the distal region, and the transitional region of the coupling member in a direction parallel to a longitudinal bore formed within the body of the earth-boring tool.

21. The earth-boring drilling tool of claim 14, further comprising an identifiable boundary between the proximal region of the coupling member and the transitional region and another identifiable boundary between the distal region of the coupling member and the transitional region, wherein the identifiable boundary and the another identifiable boundary both extend laterally across the body of the earth-boring tool in a direction substantially perpendicular to a longitudinal bore formed within the body.

22. The earth-boring drilling tool of claim 14, wherein the distal region of the coupling member is coupled to the body, wherein the first material composition of the distal region of the coupling member is chemically or metallurgically compatible with the particle-matrix material of the body, and wherein the second material composition of the proximal region of the coupling member is chemically or metallurgically compatible with a metal or metal alloy material.

* * * * *

UNITED STATES PATENT AND TRADEMARK OFFICE
CERTIFICATE OF CORRECTION

PATENT NO. : 9,206,651 B2
APPLICATION NO. : 12/603978
DATED : December 8, 2015
INVENTOR(S) : John H. Stevens, Jimmy W. Eason and Ian D. Harris It is certified that error appears in the above-identified patent and that said Letters Patent is hereby corrected as shown below:

In the specification:
COLUMN 5, LINE 15, change "which that" to --that--

In the claims:
CLAIM 13, COLUMN 15, LINE 37, change "to comprises" to --to comprise--

Signed and Sealed this
Twenty-ninth Day of March, 2016

Michelle K. Lee
*Director of the United States Patent and Trademark Office*